United States Patent
Enficiaud et al.

(10) Patent No.: US 6,728,316 B2
(45) Date of Patent: Apr. 27, 2004

(54) VIDEO CODING METHOD

(75) Inventors: Raffi Enficiaud, Marseilles (FR);
Béatrice Pesquet-Popescu, Fontenay-sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 314 days.

(21) Appl. No.: 09/947,781

(22) Filed: Sep. 7, 2001

(65) Prior Publication Data

US 2002/0118759 A1 Aug. 29, 2002

(30) Foreign Application Priority Data

Sep. 12, 2000 (EP) ................................. 402511
Dec. 19, 2000 (EP) ................................. 403591

(51) Int. Cl.$^7$ .............................................. H04N 7/12
(52) U.S. Cl. .................................. 375/240.19; 382/240
(58) Field of Search ................ 375/240.19, 240.03, 375/240.26; 382/240

(56) References Cited

U.S. PATENT DOCUMENTS

| | | | | |
|---|---|---|---|---|
| 5,764,807 A | * | 6/1998 | Pearlman et al. | 382/240 |
| 6,137,915 A | * | 10/2000 | Chai | 382/240 |
| 6,148,111 A | * | 11/2000 | Creusere | 382/240 |
| 6,208,692 B1 | * | 3/2001 | Song et al. | 375/240.19 |
| 6,253,165 B1 | * | 6/2001 | Malvar | 703/2 |
| 6,487,319 B1 | * | 11/2002 | Chai | 382/240 |
| 6,519,284 B1 | * | 2/2003 | Pesquet-Popescu et al. | 375/240.11 |
| 6,553,147 B2 | * | 4/2003 | Chai et al. | 382/240 |
| 6,560,371 B1 | * | 5/2003 | Song et al. | 382/240 |

FOREIGN PATENT DOCUMENTS

| WO | WO9716029 | 10/1996 | H04N/7/30 |
|---|---|---|---|
| WO | WO9917257 | 9/1998 | G06T/9/00 |

OTHER PUBLICATIONS

L. Bottou et al, "The Z-Coder Adaptive Binary Coder", AT&T Labs, Research, Redbank, NJ, Universite De Montreal, Montreal PQ, Canada, H3C3J7.

* cited by examiner

*Primary Examiner*—Chris Kelley
*Assistant Examiner*—George A Bugg, Jr.

(57) ABSTRACT

The invention relates to a video coding method applied to a sequence of frames and based on a tridimensional (3D) wavelet decomposition with motion estimation and compensation on couples of frames. The method comprises the steps of organizing the wavelet coefficients resulting from said decomposition in a structure of macroblocks, separated by resolution flags, and blocks with a size fitting the lowest approximation sub-band of the decomposition, scanning the coefficients of each 3D macroblock in a predefined order connected to the spatial orientation and the location of each of its blocks, and encoding said scanned coefficients bitplane by bitplane. Moreover, the encoding step includes a global bitrate allocation sub-step between the macroblocks, by means of a global distortion minimization.

10 Claims, 7 Drawing Sheets

FIG.1

| 0 | 2 | 5 | 7 | 17 | 19 | 21 | 23 |
|---|---|---|---|---|---|---|---|
| 1 | 3 | 9 | 11 | 25 | 27 | 29 | 31 |
| 4 | 6 | 12 | 13 | 33 | 35 | 37 | 39 |
| 8 | 10 | 14 | 15 | 41 | 43 | 45 | 47 |
| 16 | 18 | 20 | 22 | 48 | 49 | 50 | 51 |
| 26 | 28 | 30 | 32 | 52 | 53 | 54 | 55 |
| 34 | 36 | 38 | 40 | 56 | 57 | 58 | 59 |
| 42 | 44 | 46 | 48 | 60 | 61 | 62 | 63 |

VIDEO CODING METHOD

The invention relates to a video coding method applied to a sequence of frames and based on a three-dimensional (3D) wavelet decomposition with motion estimation and compensation on couples of frames, said decomposition being a wavelet transform that leads from the original set of picture elements (pixels) of the frames to transform coefficients constituting a hierarchical pyramid, and a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid.

The main present research directions in video compression, especially in the field of multimedia, are related to the scalability and the progressive transmission. With such functionalities, a transmission process can send only a subset of an original signal in order to achieve a desired level of resolution and/or fidelity. The most important information is sent first, then it is refined as much as the bandwidth of the receiver allows. Embedding the bitstream is the other important feature to achieve: the coding and decoding process can then be used on some networks on which interruptions during the transmission or loss of information may occur, since the data effectively transmitted are used efficiently to reconstruct as much as information as possible. Moreover, all the necessary information for decoding a shorter part of the bitstream has to be self-sufficient.

Some of the above mentioned points may be achieved by applying well-known techniques like the bit-plane encoding: the most significant bit-plane is encoded first, and, at each pass, the following bit-plane is transmitted. In such a progressive transmission scheme, the highest bit-planes may contain many zeros and would be very well compressed via an entropy encoder. If one further develops this analysis in the case of still pictures, using a wavelet decomposition leads to a good correlation of the coefficients, and therefore to good compression ratios. For video (moving pictures) compression schemes, a temporal multiresolution analysis can be used to reduce the redundancy, but it has to be combined with motion estimation (ME) and motion compensation (MC) techniques, in order to take into account large displacements and to improve coding efficiency.

Figure 1:
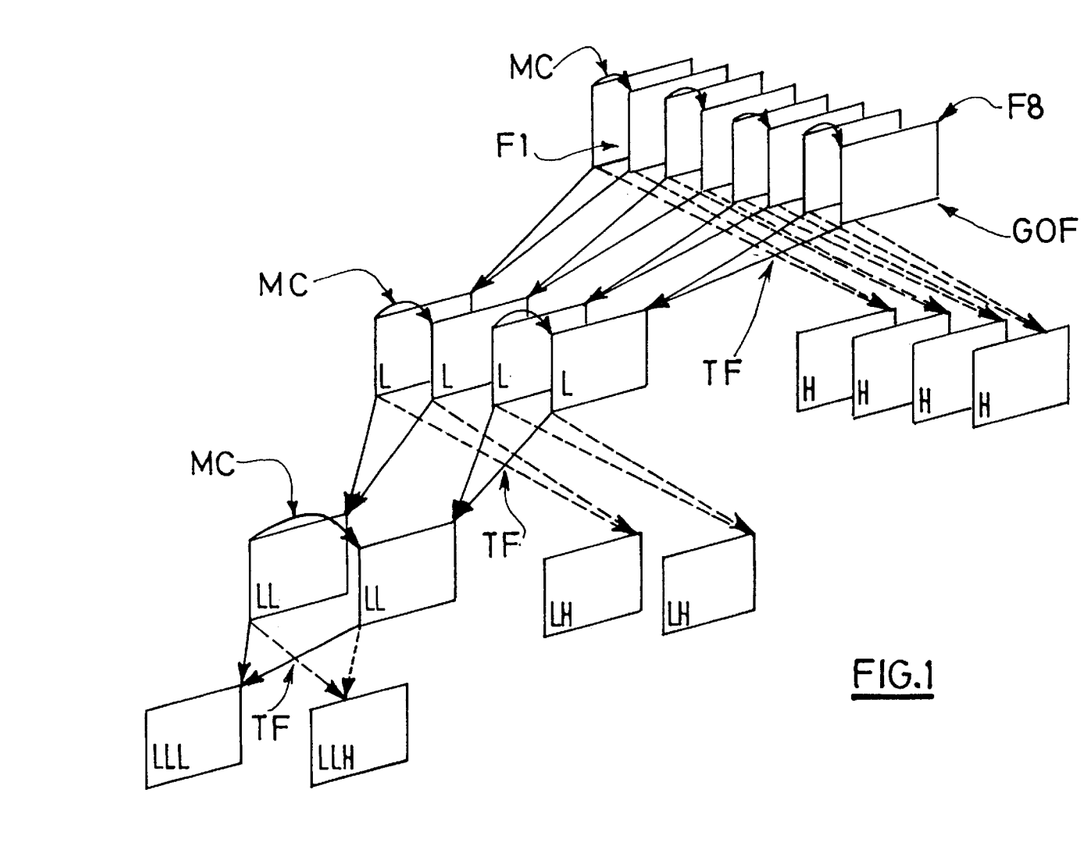
FIG. 1 shows the temporal sub-band decomposition of the video information (in the present case, a group of eight frames, or GOF), in a 3D sub-band decomposition with motion compensation.

The decomposition process can be represented by a binary tree, as illustrated in FIG. 1 that shows a temporal subband decomposition of the video information. The illustrated 3D wavelet decomposition with motion compensation is applied to a group of frames (GOF), referenced F1 to F8. In this 3D subband decomposition scheme, each GOF of the input video is first motion-compensated (MC), which allows to process sequences with large motion, and then temporally filtered (TF) using Haar wavelets (the dotted arrows correspond to a high-pass temporal filtering, while the other ones correspond to a low-pass temporal filtering). In FIG. 1, three stages of decomposition are shown (L and H=first stage; LL and LH=second stage; LLL and LLH=third stage).

After this spatio-temporal decomposition process, usually data contained in the low frequency subbands present high absolute values. The values tend to decrease when scanning the coefficients toward the highest frequencies. The progressive coding is more efficient if the wavelet coefficients are reordered to obtain groups of coefficients having approximately the same magnitude. By applying this principle, longer runs of zeros and a better compression ratio can be obtained.

Efficient algorithms for creating such groups of coefficients already exist. For instance, the so-called "Embedded Zero-tree Wavelet (EZW)" method provides trees of coefficients with strong correlation at several resolutions. It exploits the fact that, if a wavelet coefficient at a particular spatial resolution and location—said the "parent" coefficient—has a magnitude below a given threshold, its descendants/offsprings (highest resolutions and same spatial location) are very likely to have also a magnitude below this threshold.

Another grouping technique, directly based on the EZW method but using a different grouping process, is presented in "A new, fast and efficient image codec based on set partitioning in hierarchical trees (SPIHT)", by A. Said and W. A. Pearlman, IEEE Transactions on Circuits and Systems for Video Technology, vol.6, n°3, June 1996, pp.243–250. This method is very efficient in clustering zero-valued coefficients at any particular bit-plane and, coupled with an arithmetical coding, is one of the most efficient image compression algorithms actually known. A three-dimensional (3D) application of this algorithm to video sequences is described in "An embedded wavelet video coder using three-dimensional set partitioning in hierarchical tree (SPIHT)", Proceedings of the Data Compression Conference, Mar. 25–27, 1997, Snowbird, Utah, USA, pp.251–260. Although extremely efficient (this efficiency takes its source in the analysis of the data to be coded), this technique has however one noticeable drawback: the computational complexity of its implementations may be really restrictive. So much time and resources are needed that it would be difficult to use directly said technique for real-time applications or implementations on small, low-cost systems.

Less efficient but with a lower computational complexity, the coding process presented in "The Z-coder adaptive coder", by L. Bottou and al., Proceedings of Data Compression Conference, Snowbird, Utah, USA, March 30–Apr. 1, 1998, pp.18–32, is another approach to bit-plane encoding. Instead of using trees to exploit parent-offspring relationships and encode a significance map, it uses a simple neighborhood relationship in the spatio-temporal domain. The neighbors, according to the data, are then classified into four different "types". These types or groups of coefficients are encoded through a Golomb code based run-length encoder. It can be noticed that entropy coders such as the run-length coder are efficient to code long runs of zeros. Such runs can be generated in a progressive coding process working bit-plane by bit-plane, since two consecutive high magnitude coefficients may be separated by several low magnitude coefficients. However, almost all wavelet coefficients at low frequencies have high magnitude, since the most part of the energy is grouped there. Instead of simply subtracting the mean of the subbands before the coding, it has been proposed, in the European patent application already cited, a more efficient computation scheme introducing a different pulse code modulation (DPCM) to code the subband presenting such a magnitude characteristic.

The efficiency of the techniques introduced above take its source in the analysis of the data to be coded. However, the complexity of the corresponding implementations may be sometimes considered as restrictive.

It is the object of the invention to propose another kind of approach, according to which the coding process is implemented regardless to the data.

To this end, the invention relates to an encoding method as defined in the introductory part of the description and which is moreover characterized in that, for obtaining an encoded bitstream scalable in SNR (signal-to-noise ratio), spatial and temporal resolutions, it comprises the steps of:

(A) organizing the transform coefficients of the spatio-temporal orientation tree in a structure of 3D macroblocks, separated by resolution flags respectively associated to the beginning of each macroblock, and blocks, the size of each block fitting the lowest approximation sub-band which contains all the transform coefficients at the coarsest resolution, and all the blocks within each 3D macroblock being themselves organized in successive two-dimensional (2D) macroblocks belonging to a specific spatial decomposition level and grouped for all the frames of a specific temporal decomposition level;

(B) scanning the coefficients of each 3D macroblock in a predetermined order defined, inside each block, by the spatial orientation of said block and, inside a macroblock, by an association of blocks having the same location in all the frames of a temporal decomposition level;

(C) encoding said scanned coefficients bitplane by bitplane.

The proposed structure—a progressive wavelet three-dimensional encoder—appears to be a satisfying approach for obtaining an embedded scalable video coding scheme, the main functionalities of which will be hereinunder described in a more detailed manner.

The present invention will now be described, by way of example, with reference to the accompanying drawings in which.

The main modules of the encoder according to the invention are provided for giving to said encoder the following functionalities:

(1) a 3D sub-band decomposition with motion estimation and motion compensation;

(2) a macroblock organization, provided in order to obtain a re-ordering of the coefficients according to their magnitude: the coefficients in the spatio-temporal tree are gathered together into blocks, and the blocks in macroblocks each of which roughly represents—except for the macroblock 0—all the coefficients of the detail sub-bands at a spatio-temporal resolution level, in all the frames of a given temporal resolution level;

(3) a vectorial DPCM prediction in macroblock 0: the approximation subband, having specific statistical properties, is separately encoded using a DPCM technique in order to reduce residual correlations between the coefficients of this sub-band (the prediction error is encoded thanks to the same algorithm as the detail coefficients);

(4) a bitrate allocation between macroblocks, by means of an algorithm minimizing the global distorsion;

(5) a bitplane encoding: the coefficients of each macroblock, scanned in a predefined order, are encoded bitplane by bitplane, two passes being performed at each bitplane level:
  (a) a significance map encoding, using an adaptive run-length encoder for encoding the coefficients that become significant at this level;
  (b) a refinement pass: during this step, aiming at maximizing the length of "0" runs, the scanning of the coefficients inside each block is realized following the spatial orientation of the details in the sub-band to which the block belongs, and refinement bits of coefficients found significant at a higher level are put in the bitstream without coding.

Figure 2:
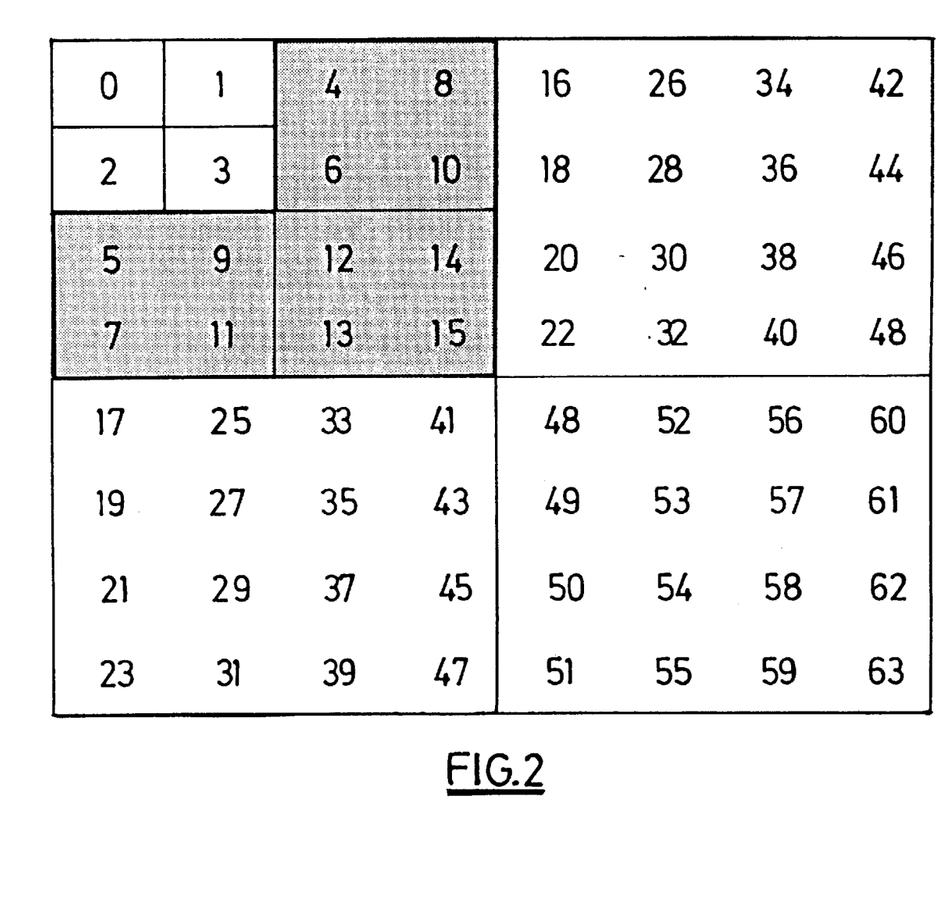
FIG. 2 illustrates the division of each frame in each spatio-temporal sub-band into blocks, and the scanning order of the blocks within macroblocks in the bidimensional (2D) case.

The encoder according to the invention first comprises a macroblock structure, inspired from the one described in "Fast progressive wavelet coding", H. S. Malvar, Proceedings of Data Compression Conference, Snowbird, Utah, USA, March 29–31, 1999, pp.336–343. Starting from the structure presented in said document, the wavelet coefficients are first organized into blocks. The size of each block is chosen such that it fits precisely the lowest approximation sub-band, which contains all the wavelet coefficients at the coarsest resolution (block 0, in FIG. 2 that illustrates the division of each frame into blocks (0, 1, 2, 3, 4, 5, etc) and the scanning order of said blocks within macroblocks in the 2D case).

Each frame being now divided into blocks in each spatio-temporal sub-band, the way to read these blocks will create a redundancy provided for improving the compression ratio, thanks to a reading/clustering of the data. In a progressive scheme with a bitplane encoding, data (i.e. wavelet coefficients) with almost the same magnitude at a given bitplane naturally present some redundancy. The sub-bands being divided into blocks, the purpose is to scan blocks that would present some similarities one after the other; typically, these blocks are issued from the same location (it is otherwise assumed that the wavelet coefficients in most cases do not present important variations within a block). The scanning order of the blocks retained in the 2D case for one frame, depicted in FIG. 2, alternates between horizontal detail sub-band and vertical detail sub-band, finishing with the diagonal detail sub-band (48, 49, 50, etc.) at the same resolution level; it takes into account the magnitude ordering of the coefficients. The coarsest resolution determines the size of the blocks and is fitted by the block 0. In this 2D case, each macroblock represents a spatial resolution refinement. The macroblock 0 is the block 0, seen as a particular spatio-temporal level, the macroblock 1 contains the blocks 1 to 3, the macroblock 2 the blocks 4 to 15, and the macroblock 3 the blocks 16 to 63.

Figure 3:
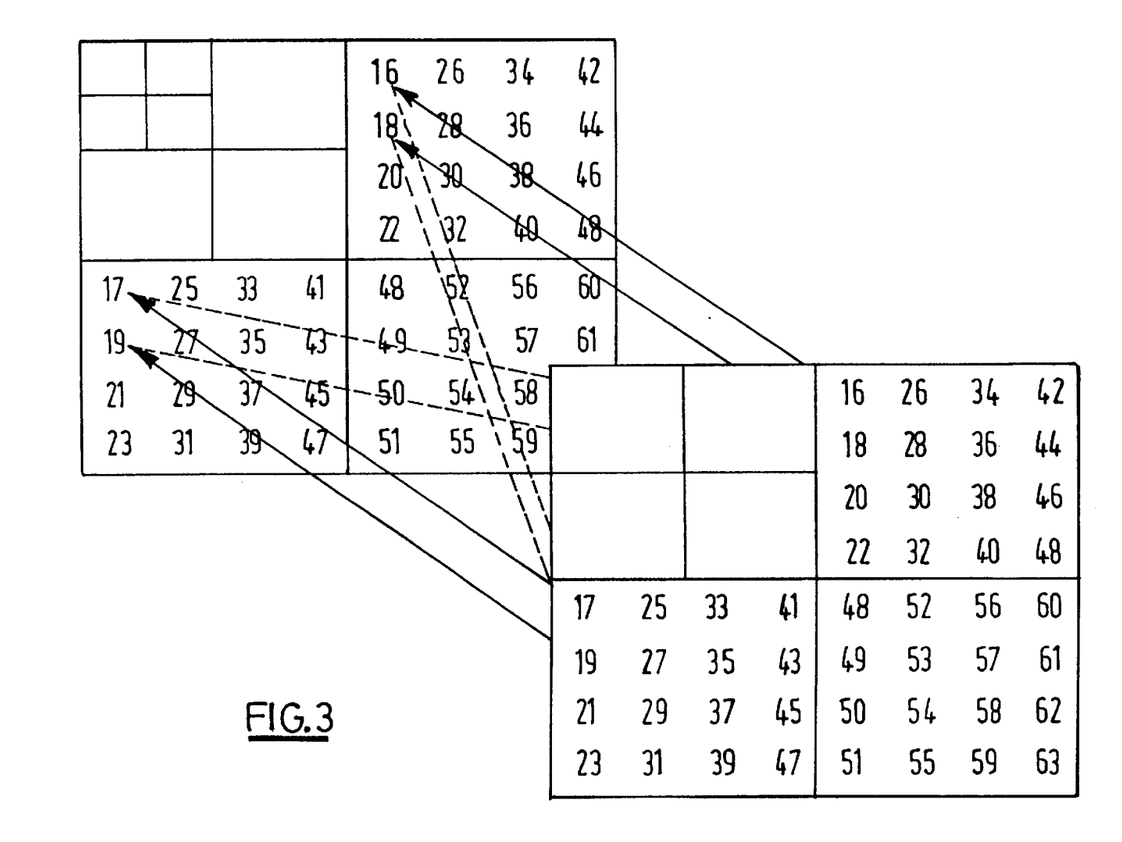
FIG. 3 illustrates the block interlacing in the case of two frames in a macroblock corresponding to the third spatial decomposition.

Besides the bitplane reordering, such a macroblock structure must allow both spatial and temporal scalability. In order to achieve this functionality (i.e. adding information related to a macroblock into the bitstream must refine both spatial and temporal resolutions), all the blocks within a macroblock belong to a specific spatial decomposition level (spatial resolution of the macroblock), for all the frames of a specific temporal level. Thus, the 3D extension of the macroblock is simply achieved, with respect to FIG. 2, by grouping all the corresponding 2D macroblocks in all the frames of a specific temporal level (for this extension, see FIG. 3 that illustrates the block interlacing in the case of two frames in the macroblocks corresponding to the third spatial decomposition): for instance, the macroblock 3 containing the blocks 16 to 63 in the 2D case contains the blocks 16 to 63 in the first frame, the blocks 16 to 63 in the second frame, and so on for the remaining frames.

Figure 4:
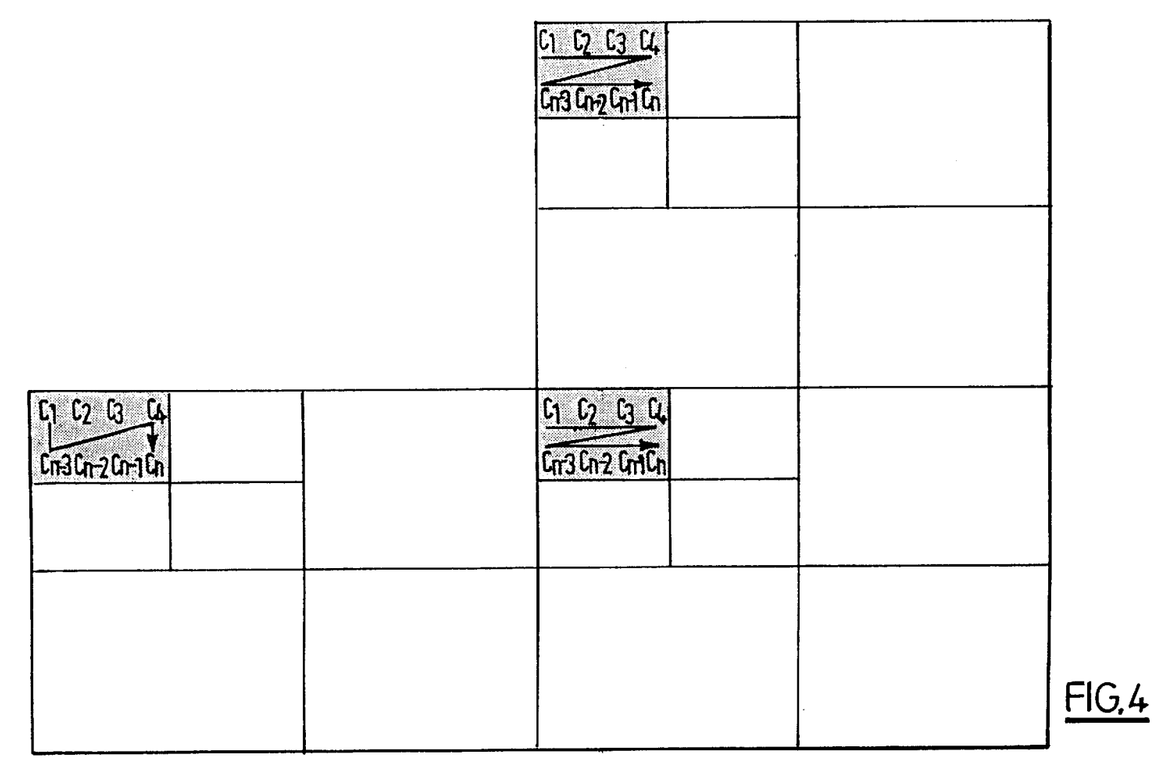
FIG. 4 shows the scanning order in horizontal, vertical and diagonal sub-bands.

In order to perform an efficient embedding in the 3D case extension, the scanning order of the blocks is interlaced between each frame rather than computing them frame by frame (for instance, the 16th block is first scanned in the first frame, and then in the second, then the 17th is scanned in the same manner, and so on), which allows to take into account the temporal correlation between the different frames of a definite temporal level and the magnitude ordering of the coefficients. Moreover, it is proposed to take advantage of some properties of the spatial sub-bands: for instance, two horizontally consecutive coefficients in horizontal detail sub-band are likely to have similar magnitudes. In order to take into account such a redundancy, the scanning of the coefficients inside each block is determined by the spatial orientation of said block: as illustrated in FIG. 4, the coefficients inside blocks belonging to horizontal and diagonal detail sub-bands are scanned following the horizontal direction, and the coefficients inside blocks belonging to vertical detail sub-bands are scanned vertically.

The reordering method described above, based on a quite general hypothesis concerning the coefficient magnitudes, is completely data independent and easily implemented, and has a low complexity. It is also characterized by the following organization of the data.

Figure 5:
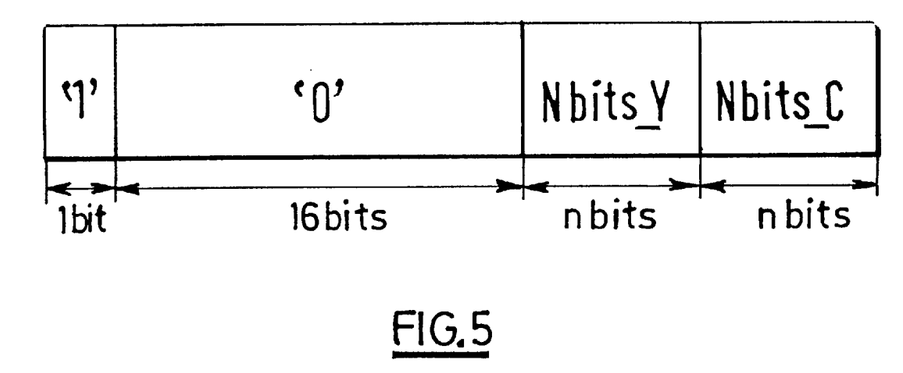
FIG. 5 illustrates the structure of the header of a macroblock.

In order to easily achieve the resolution scability, it is indeed needed to separate each spatial and temporal level. For instance, if it is requested to reconstruct the coded sequence twice smaller, it is necessary to get rid of the highest spatial level at each temporal resolution. Since a macroblock—by virtue of its construction—corresponds to a specific spatio-temporal level, in order to provide a scalability feature, each macroblock is separated by marking its beginning with a flag, i.e with a unique sequence not allowed in the rest of the bitstream. As depicted in FIG. 5, which shows the structure of the header of a macroblock, this resolution flag allowing to achieve a scalable bitstream is represented in this example by the first 17 bits of the header: 1 bit for "1"+16 bits for "0".

This resolution flag is followed by two numbers of bits called Nbits_Y and Nbits_C. These numbers, as explained hereinunder, represent the number of bitplanes used to code the luminance Y and the chrominance C (U or V). They also represent the total number of bits used to code any of the wavelet coefficients within a macroblock, respectively for the luminance and the chrominance. Their values are given by:

$$\text{Nbits\_Y} = \left\lfloor \log_2\left(\max_{E_Y}|\text{coef\_Y}|\right) \right\rfloor + 1$$

$$\text{Nbits\_C} = \left\lfloor \log_2\left(\max_{E_U \cup E_V}|\text{coef\_C}|\right) \right\rfloor + 1$$

where the function $x \to \lfloor x \rfloor$ maps the value x to its integer part, and $E_y$, $E_u$, $E_v$ are the sets of coefficients of respectively the Y, U, V planes in the current macroblock. As these values only concern a macroblock, they are appended to the bitstream in the header, just after the macroblock flag. The number of bits needed to code these two values, which may vary from a macroblock to another, is typically high for the lowest spatio-temporal frequency subbands.

As a good PSNR (peak signal-to-noise ratio) cannot be easily reached at very high bitrates if only the integer part of the wavelet coefficients is coded, the precision may be refined by multiplying each wavelet coefficient by a constant value before its coding, respectively C_Y and C_C for the luminance and chrominance planes. By adjusting the value of these two constants, the maximum precision of the wavelet coefficients may be defined (for instance, if C_Y is equal to 16, the coefficients of Y are rounded to the nearest $1/16$ value). With these constants, the values of Nbits_Y and N bits_C become:

$$\text{Nbits\_Y} = \left\lfloor \log_2\left(\max_{E_Y}|\text{coef\_Y}|\right) \right\rfloor + \lfloor \log_2|C\_Y| \rfloor + 1$$

$$\text{Nbits\_C} = \left\lfloor \log_2\left(\max_{E_U \cup E_V}|\text{coef\_C}|\right) \right\rfloor + \lfloor \log_2|C\_C| \rfloor + 1$$

The number of bits "n" used to code these two values may also vary, depending on the desired precision of each wavelet coefficient. In the present embodiment, 4 bits were enough to code with a precision of the unity, and 5 bits for a precision of $1/16$; generally, 8 bits are enough for any implementation. Whatever the case (i.e. considering N bits_Y and Nbits_C either without or with refinement), these values indicate the needed bitplanes used to code only the relevant data of Y and C while avoiding useless long runs of zeros at the beginning of a macroblock, in the case of small wavelet coefficients (typically in the high frequency sub-bands).

Figure 6:
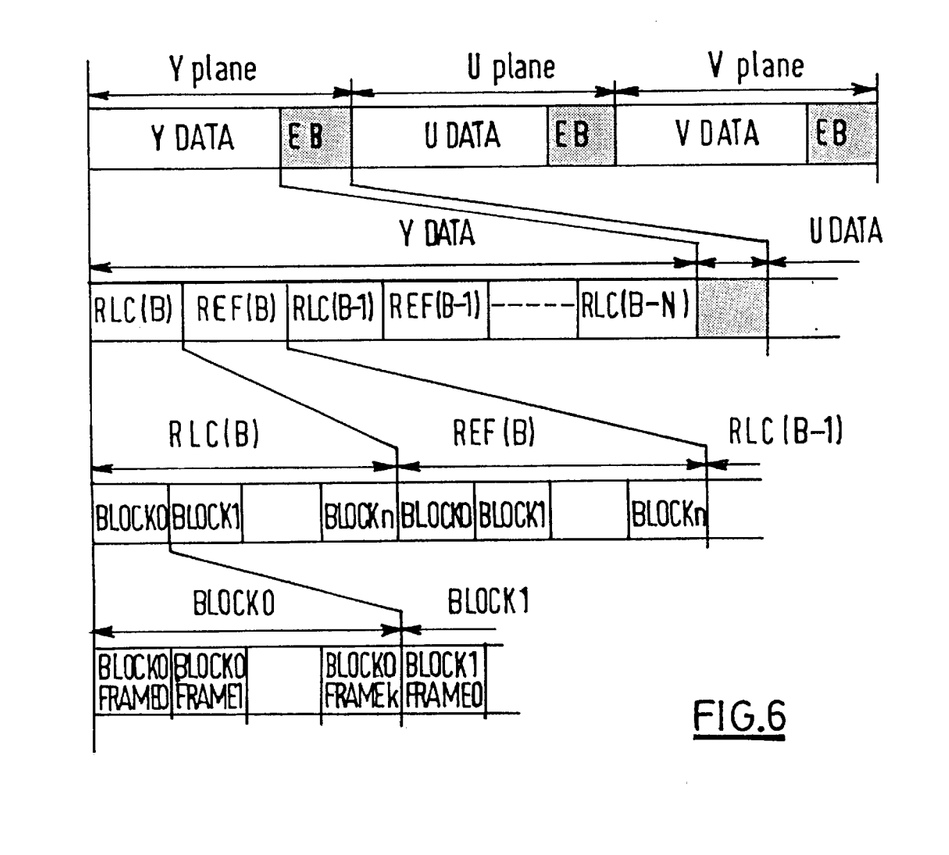
FIG. 6 illustrates the macroblock structure in the bitstream.

Concerning the data themselves (issued from the progressive bitplane encoding), they are appended to the bitstream just following the header. As the main constraint is the bitrate scalability (to be able to decode a sequence at a bitrate different from the one used to encode it), the embedding of the three color planes (Y-plane, U-plane, V-plane) is performed within a macroblock, by interlacing the color planes by groups of blocks. Such a macroblock and block structure in the bitstream is illustrated in FIG. 6, in the case of a macroblock of n blocks and k frames, the detailed structure being the following: the first line of said FIG. 6 shows the embedding of the Y, U, and V-planes (with ending bits EB between Y, U and V data), the second line shows in greater detail the content of, for instance, the Y data (successively run-length code RLC(B) for the bitplane B, and corresponding refinement bits REF(B); then RLC(B-1) and REF(B-1); . . . ; etc. . . . ; RLC(B-N)), the third line indicates the blocks 0 to n for which these run-length codes and corresponding refinement bits are given, and the fourth line the frames 0 to k in each block (0, 1, 2, . . . , n).

As the encoding step is adaptive, it is not exactly known how many bits will be appended to the bitstream the next time a bit is encoded, but it is possible to determine at least the maximum number of bits at any stage of the encoding (and decoding) process, which is equal to k+2. In order to perform a fine bitrate control, it is appropriate to test, each time a RLR code is encoded, if there is enough budget to code at least (k+2) bits for the next RLR code that has to be appended. If it is not the case, useless bits—that may be called "ending bits EB"—are appended in order to perform a bit control to the nearest bit.

Figure 7:
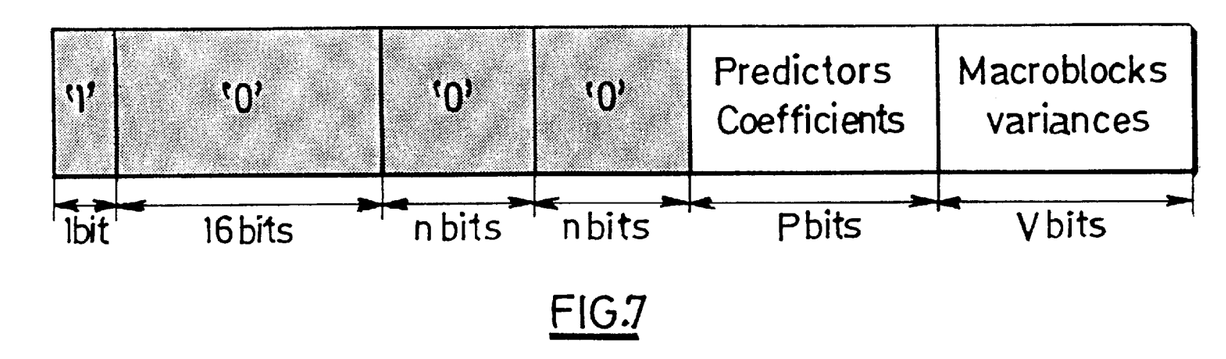
FIG. 7 illustrates the structure of the header of a GOF.

Some additional points may be considered when starting to encode the beginning of a group of frames (GOF). Actually, one has to be able to separate each macroblock and each GOF as well. Besides containing the coarsest spatio-temporal resolution, its header must also include information needed for all the GOF (in case of linear prediction, the predictor coefficients are needed at the decoding side). Moreover, in as much as to decode correctly the information, one has to determine precisely the bitrate used to encode the information for each macroblock, and the variance of each of them is also transmitted in the header of the GOF (said variance cannot be appended to the bitstream in the header previously described, since the method used to determine the bitrate needs the variances of all macroblocks). Said GOF header is shown in FIG. 7.

Also, the flag of macroblock previously described can be used to indicate the end of a previous macroblock and the beginning of a new one. In order to differentiate the beginning of a macroblock and the beginning of the GOF, it can be observed that it is not very likely to have a macroblock containing only zeros. The structure chosen to mark the beginning of the GOF is the same as the flag of macroblock, except that Nbits_Y and Nbits_C are automatically set to zero. The detection of a GOF flag is realized almost as for macroblocks: once a flag has been reached, a simple test of Nbits_Y and Nbits_C indicates the beginning of a macroblock or a GOF.

The coding method thus proposed may also be improved by simplifying the budget allocation. For obtaining this simplification, a macroblock structure inspired from the one mentioned in the previously cited document "Fast progressive wavelet coding" is introduced and applied to the 3D wavelet decomposition. This macroblock structure, the main point of which is to order the data to obtain a better compression ratio during the entropy encoding, is now described. First, the wavelet coefficients are organized into "blocks". The size of each block is chosen such that it fits precisely the lowest approximation subband, which contains all wavelet coefficients at the coarsest resolution. Thus, each frame in each spatio-temporal subband is divided into blocks. The way to read these blocks would create redundancy: in a progressive scheme with a bit-plane encoding, it may be observed that, at a given bit-plane, data with almost same magnitude naturally present some redundancy. The subbands being divided into blocks, the purpose is to scan blocks that would present some similarities one after the other. Typically, these blocks are issued from the same spatial location. It is otherwise supposed that wavelet coefficients in most cases do not present important variations within a block. The scanning order of the blocks alternates between horizontal detail subband and vertical detail subband, finishing with the diagonal detail subband at the same resolution level. This order takes into account the magnitude ordering of the coefficients. The coarsest resolution determines the size of the blocks and is fitted by the block 0. In this 2D case, each macroblock represents a spatial resolution refinement. The macroblock 0 is the block 0 (seen as a particular spatio-temporal level).

Besides bit-plane reordering, the second main point of the macroblock structure is to allow both spatial and temporal scalability. In order to achieve this, the main point is that adding information relative to a macroblock into the bitstream must refine both spatial and temporal resolutions. Hence, all blocks within a macroblock belong to a specific spatial decomposition level (spatial resolution of the macroblock), for all the frames of a specific temporal level. In this manner, the 3D extension of the macroblock is simply achieved by grouping all the corresponding 2D macroblocks in all the frames of a specific temporal level. For instance, the macroblock 3 containing blocks from 16 to 63 in the 2D case contains blocks from 16 to 63 in the first frame, blocks 16 to 63 in the second frame, and so on for the remaining frames.

In order to perform an efficient embedding in the 3D case extension, the scanning order of the blocks is then interlaced between each frame rather than computing them frame by frame, which allows to take into account the temporal correlation between the different frames of a definite temporal level and the magnitude ordering of coefficients. The reordering method proposed above, completely data independent, is only based on a quite general hypothesis about the coefficient magnitude. In this way, the same efficiency as the one achieved by the 3D-SPIHT cannot be obtained. However, the strength of this method lies in the ease of implementation and the low complexity of the algorithm.

Bit allocation is performed at two levels as described below:

first, the global bit budget is allocated between Y, U and V planes;

second, for each colour plane, the remaining bit budget is allocated between macroblocks.

(a) Bit Allocation Between Colour Planes

As previously mentioned, the chrominance planes have a resolution twice smaller than the luminance plane (size divided by 4). Moreover, less spatial details are present in these planes. Therefore, the bit budget necessary for encoding the chrominance coefficients is much smaller than the one necessary for the luminance coefficients. A further reduction can be obtained if the dependencies between luminance and chrominance are taken into account in the coding process. In order to determine the optimal bit allocation between colour planes, the following method is used: the global bit budget R is divided between $R_Y$, $R_U$ and $R_V$ which are the bit budget for respectively Y, U and V planes.

$$R = R_Y + R_U + R_V \text{ where } R_Y = \alpha \cdot R \text{ and } R_U = R_V = \frac{1-\alpha}{2} \cdot R$$

The parameter $\alpha \in [0,1]$ controls the allocation process (its optimal value has been determined by a dichotomic approach: in the present case, the tests have shown that it may vary between 0.6 and 0.9).

(b) Bit Allocation Between Macroblocks

The algorithm now described gives a method for allocating the bit budget per macroblock in order to minimize the global distortion of the coding process. The notations will be the following ones:

'N' is the number of pixels in the whole GOF (or, also, the sum of the number of coefficients of macroblocks);

'$M_i$' is the $i^{th}$ macroblock, '$\sigma_i$' the variance of $M_i$, '$n_i$' the number of points it contains and '$b_i$' the number of bits per coefficient used in this $i^{th}$ macroblock, and 'I' the number of macroblocks;

'$D_i$' is the distortion of $M_i$, and '$D_g$' the global distortion on all macroblocks. Assuming a uniform quantization on the macroblock $M_i$, the distortion '$D_i$' of this macroblock is given by:

$$D_i = \sigma_i \cdot 2^{-2 \cdot b_i}$$

The global distortion '$D_g$' of the whole encoding process is given by:

$$D_g = \sum_{j \in I} D_j = \sum_{j \in I} \sigma_j \cdot 2^{-2 \cdot b_j}$$

The global bitrate $\bar{b}$ for the encoded sequence is given by:

$$\bar{b} = \sum_{j \in I} \frac{b_j \cdot n_j}{N}$$

The criterion to be minimized can be written, using the Lagrange multipliers method, as:

$$J_\lambda = D_g + \lambda \cdot \left( \sum_{j \in I} \frac{b_j \cdot n_j}{N} - \bar{b} \right)$$

Without any constraint for the budget of each macroblock, this reduces to a well known bit allocation method, whose solution is given by:

$$\tilde{R}_k = \bar{b} + \frac{1}{2} \cdot \log_2 \left( \frac{\sigma_k^2}{\prod_{k=1}^{I} \left[ (\sigma_k^2)^{\frac{n_k}{N}} \right]} \right)$$

The direct application of this method in the present case led to very bad results, especially at low bit rates (in fact it allocated to most of the macroblocks a negative budget). To circumvent this problem, the optimization criterion has been changed by adding a supplementary constraint, which is the positivity of the solution. The criterion becomes:

$$J_\lambda = D_g + \lambda \cdot \left( \sum_{j \in I} \frac{b_j \cdot n_j}{N} - \bar{b} \right) \Big/ \forall \, j \in I, \, b_j \geq 0$$

Figure 8:
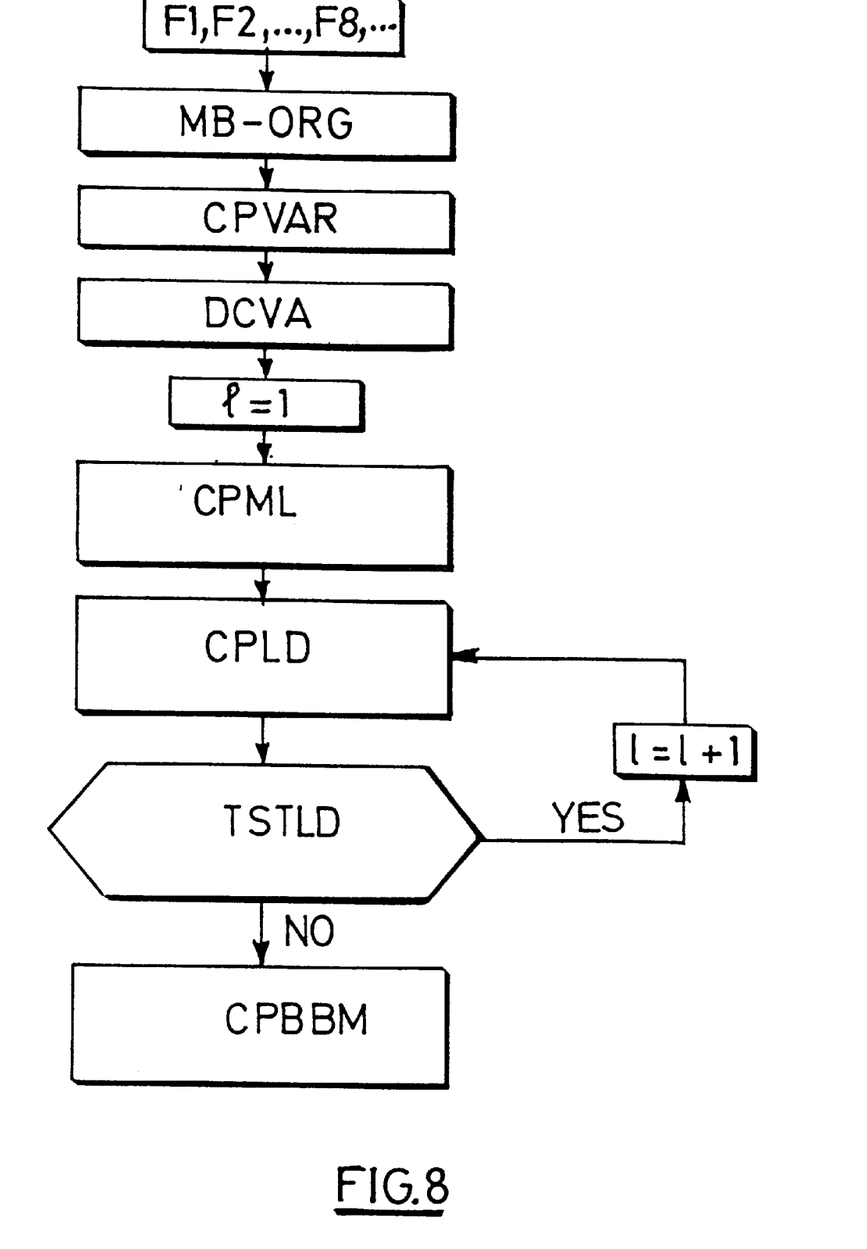
FIG. 8 is a flowchart related to an embodiment of the invention.

Finally the algorithm described below (and in FIG. 8) and applied to the macroblock organization previously described (MB-ORG), gives the proposed solution, associated to the latter formula:

1. Order the macroblocks by decreasing variance (step DCVA), after having computed said variances (step CPVAR)

$$+\infty \geq \sigma_1 \geq \sigma_2 \geq \ldots \geq \sigma_I \geq 0$$

2. Set l=1
3. Calculate $M_l$ (step CPML) and $\lambda_l$ (step CPLD) as:

$$\lambda_l = -2 \cdot \log(2) \cdot 2^{-\frac{2 \cdot N}{M_l} \bar{b}} \cdot \prod_{k=1}^{l} \left[ (\sigma_k^2)^{\frac{n_k}{M_l}} \right] \text{ where } M_l = \sum_{i=1}^{l} n_i \quad \text{Equation 1}$$

4. If $\lambda_l$ verify the following inequality (step TSTLD):

$$-2 \cdot \log(2) \cdot \sigma_l^2 < \lambda_l \leq -2 \cdot \log(2) \cdot \sigma_{l+1}^2 \quad \text{Equation 2}$$

then set l=l+1 (reply YES) and go to step 0 (up to the maximal value).

5. If the reply to the test is NO, calculate (step CPBBM) the number of bits $\tilde{R}_{k,l}$ for each macroblock k using the following equation:

$$\tilde{R}_{k,l} = \begin{cases} \frac{N}{M_l} \cdot \bar{b} + \frac{1}{2} \log_2 \left( \frac{\sigma_k^2}{\prod_{k=1}^{l} \left[ (\sigma_k^2)^{\frac{n_k}{M_l}} \right]} \right) & \text{for } k \in \{1, \ldots, l\} \\ 0 & \text{for } k \in \{l+1, \ldots, I\} \end{cases} \quad \text{Equation 3}$$

What is claimed is:

1. A video coding method applied to a sequence of frames and based on a three-dimensional (3D) decomposition with motion estimation and compensation on couples of frames, said decomposition being a wavelet transform that leads from the original set of picture elements (pixels) of the frames to transform coefficients constituting a hierarchical pyramid, and a spatio-temporal orientation tree—in which the roots are formed with the pixels of the approximation subband resulting from the 3D wavelet transform and the offspring of each of these pixels is formed with the pixels of the higher sub-bands corresponding to the image volume defined by these root pixels—defining the spatio-temporal relationship inside said hierarchical pyramid, said method being characterized in that, for obtaining an encoded bitstream scalable in SNR (signal-to-noise ratio), spatial and temporal resolutions, it comprises the steps of:

(A) organizing the transform coefficients of said tree in a structure of 3D macroblocks, separated by resolution flags respectively associated to the beginning of each macroblock, and blocks, the size of each block fitting the lowest approximation sub-band which contains all the transform coefficients at the coarsest resolution, and all the blocks within each 3D macroblock being themselves organized in successive two-dimensional (2D) macroblocks belonging to a specific spatial decomposition level and grouped for all the frames of a specific temporal decomposition level;

(B) scanning the coefficients of each 3D macroblock in a predetermined order defined, inside each block, by the spatial orientation of said block and, inside a 3D macroblock, by an association of blocks having the same location in all the frames of a temporal decomposition level;

(C) encoding said scanned coefficients bitplane by bitplane.

2. A coding method according to claim 1, characterized in that the bitplane encoding is performed in two passes:

(a) a first pass carrying out a significance map encoding operation, involving the coefficients that become significant at the concerned bitplane;

(b) a second pass carrying out a refinement operation, for transmitting without additional encoding the refinement bits of coefficients already significant.

3. A coding method according to claim 1, characterized in that a global bitrate allocation sub-step is moreover carried out between the 3D macroblocks, before said encoding step, by means of a global distortion minimization.

4. A coding method as claimed in claim 3, wherein said global bitrate allocation sub-step itself comprises the operations of:

allocating a global bit budget R between the three luminance and chrominance planes Y, U, V;

for each colour plane Y, U and V, allocating the remaining bit budget between the 3D macroblocks.

5. A video coding method as claimed in claim 4, wherein the global bit budget R is divided into three bit budgets R(Y), R(U), R(V) corresponding to the three planes Y, U, V respectively, according to the following relations:

$R=R(Y)+R(U)+R(V)$ $R(Y)=\alpha.R$ $R(U) = R(V) = \dfrac{1-\alpha}{2} \cdot R$ $\alpha \epsilon [0,1]$.

6. A coding method as claimed in claim 5, wherein the optimal value of the parameter a controlling the bit budget allocation between the three planes is comprised in the interval [0,6–0,9] and is determined by a global dichotomic approach.

7. A coding method as claimed in claim 4, wherein said remaining bit budget is allocated between the 3D macroblocks according to the following operations:

(a) to compute the variance of each 3D macroblock;

(b) to classify said 3D macroblocks according to decreasing variances;

(c) to carry out, for finding the optimum rate for each 3D macroblock, the following iterative procedure:

(1) to initialize at l=1 the number of processed 3D macroblocks;

(2) to compute the Lagrangian λ (l) according to the relation:

$$\lambda_l = -2 \cdot \log(2) \cdot 2^{-\frac{2 \cdot N}{M_l} \cdot \bar{b}} \cdot \prod_{k=1}^{l} \left[ (\sigma_k^2)^{\frac{n_k}{M_l}} \right] \text{ where } M_l = \sum_{i=1}^{l} n_i$$

(3) to verify if λ (l) satisfies, or not, the relation:

$-2 \cdot \log (2) \cdot \sigma_l^2 < \lambda_l \le -2 \cdot \log (2) \cdot \sigma_{l+1}^2$ (i) if the answer to this test is YES, to increase the stepsize l by 1 (i.e. l=l+1) and return to (2);

(ii) if the answer is NO, the optimum number of 3D macroblocks has been found, and their respective budget is obtained by means of the two relations:

$$\tilde{R}_{k,l} = \begin{cases} \dfrac{N}{M_l} \cdot \bar{b} + \dfrac{1}{2} \log_2 \left( \dfrac{\sigma_k^2}{\prod_{k=1}^{l} \left[ (\sigma_k^2)^{\frac{n_k}{M_l}} \right]} \right) & \text{for } k \epsilon \{1, \ldots, l\} \\ 0 & \text{for } k \epsilon \{l+1, \ldots, I\} \end{cases}$$

8. For use in a video coder receiving a sequence of frames and based on a three-dimensional (3D) wavelet decomposition with motion estimation and compensation on couples of frames, computer-executable process steps provided to be stored on a computer-readable storage medium for coding said frames and comprising the steps of organizing the wavelet coefficients resulting from said decomposition in a structure of macroblocks, separated by resolution flags, and blocks, the size of each block fitting the lowest approximation sub-band of the decomposition, scanning the coefficients of each 3D macroblock in a predetermined order defined by the spatial orientation of each of its blocks and, inside the 3D macroblock, by an association of blocks having the same location in all the frames of a temporal decomposition level, and encoding said scanned coefficients bitplane by bitplane, said coding step including a global bitrate allocation sub-step between the macroblocks, by means of a global distortion minimization.

9. A computer program product for a video coder provided for coding a sequence of frames according to a set of instructions which when loaded in said coder lead it to carry out the process step as claimed in claim 8.

10. A transmittable coded signal produced by coding a sequence of frames according to a coding method comprising the steps of organizing the wavelet coefficients resulting from said decomposition in a structure of macroblocks, separated by resolution flags, and blocks, the size of each block fitting the lowest approximation sub-band of the decomposition, scanning the coefficients of each 3D macroblock in a predefined order connected to the spatial orientation and the location of each of its blocks, and encoding said scanned coefficients bitplane by bitplane, said coding step including a global bitrate allocation sub-step between the macroblocks, by means of a global distortion minimization.

* * * * *